O. W. STEINDORFF.
RELIEVING ATTACHMENT FOR LATHES.
APPLICATION FILED DEC. 1, 1915.
1,214,236.
Patented Jan. 30, 1917.
3 SHEETS—SHEET 1.
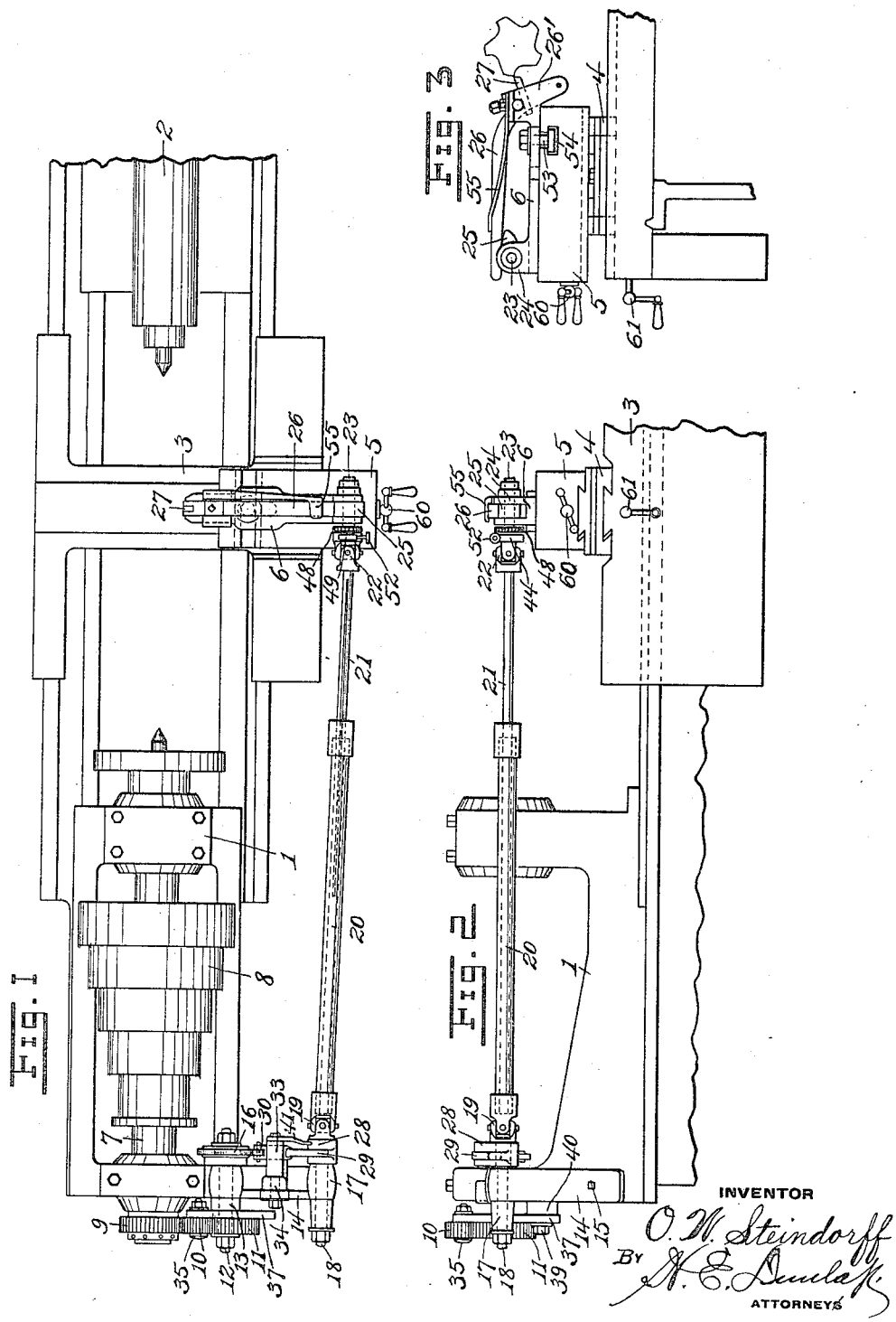

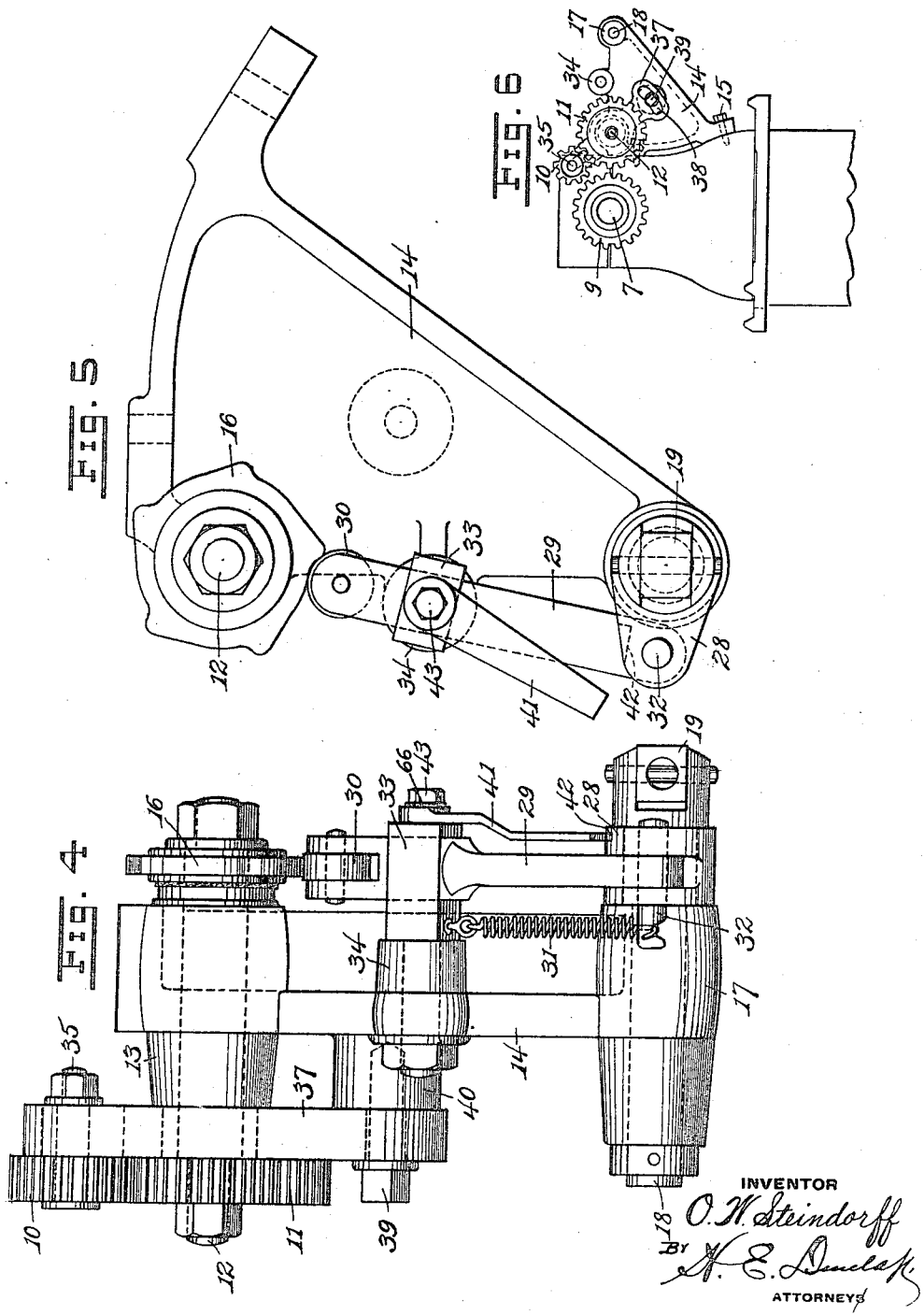

O. W. STEINDORFF.
RELIEVING ATTACHMENT FOR LATHES.
APPLICATION FILED DEC. 1, 1915.
1,214,236.
Patented Jan. 30, 1917.
3 SHEETS—SHEET 3.
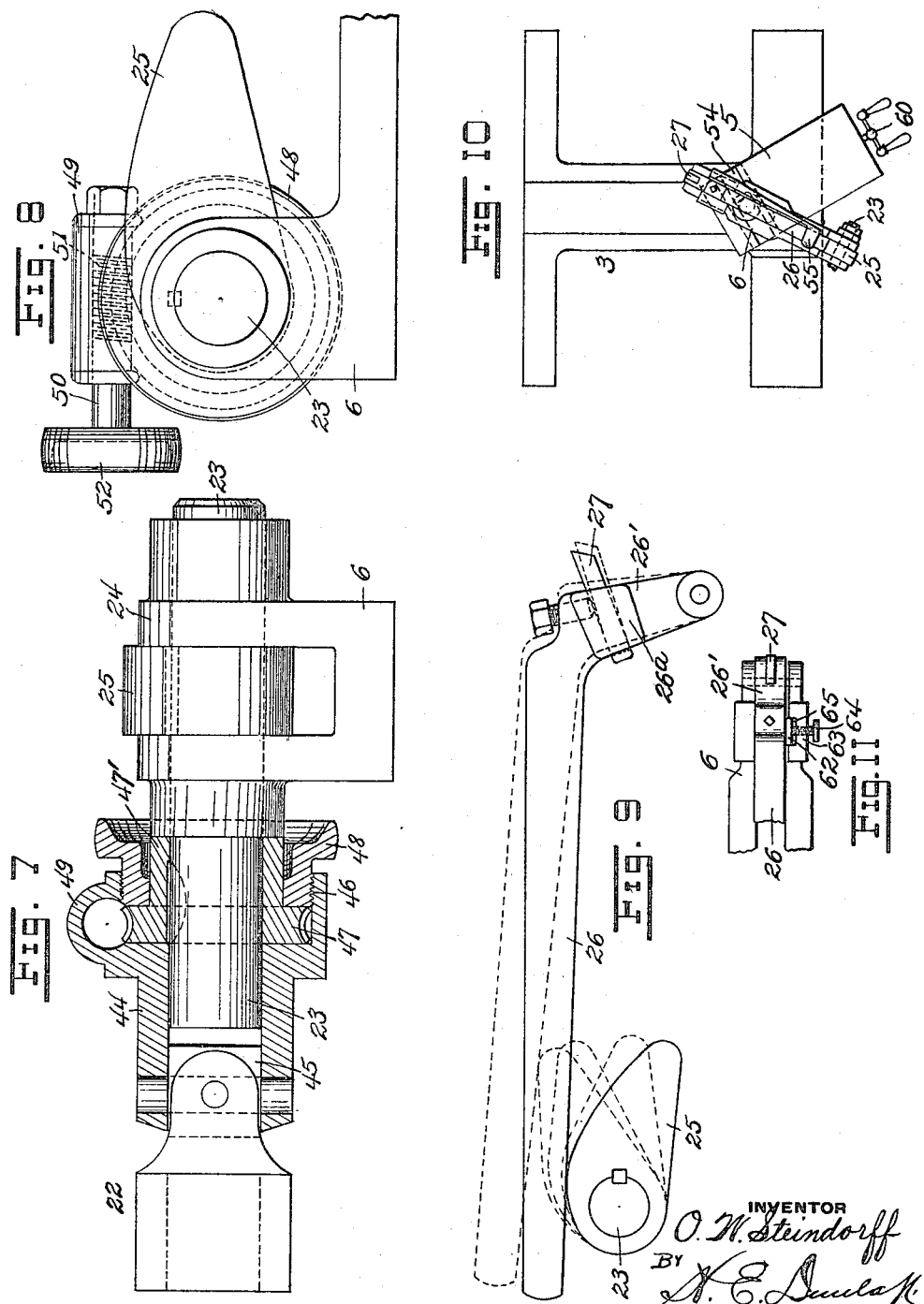

UNITED STATES PATENT OFFICE.

OTTO W. STEINDORFF, OF WHEELING, WEST VIRGINIA.

RELIEVING ATTACHMENT FOR LATHES.

1,214,236.   Specification of Letters Patent.   Patented Jan. 30, 1917.

Application filed December 1, 1915. Serial No. 64,405.

*To all whom it may concern:*

Be it known that I, OTTO W. STEINDORFF, a citizen of the United States of America, and resident of Wheeling, county of Ohio, and State of West Virginia, have invented certain new and useful Improvements in Relieving Attachments for Lathes, of which the following is a specification.

This invention relates broadly to lathe attachments, and specifically to mechanism for relieving the teeth of cutters.

The primary object of the invention is to provide, as an attachment for lathes, improved mechanism for relieving or backing off the teeth of taps, reamers, milling cutters, and the like, forming eccentric surfaces back of the cutting edges.

A further object is to provide a mechanism of the character mentioned which is readily applicable to angular work as well as tapered and straight work and which may be accurately adjusted to perform practically every character of work which may be required of a backing off tool.

With these and other important objects in view, the invention resides in the features of construction, arrangement of parts and combinations of elements which will hereinafter be fully described, reference being had to the accompanying drawings, forming a part of this specification, in which—

Figure 1 is a top plan view of a lathe embodying my invention; Fig. 2 is a side elevation of the same; Fig. 3 is a side elevation of the compound rest and tool head, showing the tool in working position; Fig. 4 is an enlarged top plan view of the transmission gear and oscillating mechanism; Fig. 5 is an enlarged inner face view of the gear supporting bracket and oscillating mechanism; Fig. 6 is an outer end view of the lathe with said bracket and the sweep arm disposed in position; Fig. 7 is an enlarged view, partly in longitudinal section, illustrating the cam and the adjusting mechanism therefor; Fig. 8 is an end view of the same; Fig. 9 is an enlarged side view of the tool holding lever and its actuating cam; Fig. 10 is a top plan view of the carriage with the compound rest and the tool head disposed at an angle to each other, illustrating one of various working positions; and Fig. 11 is a detail view in top plan of a portion of the tool head and tool holder, showing the adjusting means for the latter.

The lathe embodies the usual headstock 1, tailstock 2, tool carriage 3, and other operating parts common to ordinary types of lathes. Adjustably mounted on the carriage is a compound rest embodying a cross slide 4, compound slide 5 and tool head 6, said slides being adapted for movement relative to the work by means of the usual screw adjustments 60 and 61.

The headstock has mounted therein the usual shaft 7 carrying a stepped pulley 8 and feed gear 9, the latter mounted on the outer end of said shaft 7. Said gear 9 is in mesh with an idler 10 through which motion is communicated to a gear 11 fixed upon a spindle 12 which is rotatably mounted in a bearing 13 formed in a bracket 14 which is rigidly attached, as by bolts 15, to a suitable portion of the headstock 1 adjacent to the outer end of the latter. Said spindle 12 has its inner end projecting beyond the bearing 13 and has fixed thereon a master cam 16 the character and purpose of which will hereinafter be explained. Said bracket 14 has also formed therein at an appropriate point a bearing 17 in which is rotatable a short shaft or spindle 18 which is connected at its inner end through a universal joint 19 with a tubular member 20 constituting a part of a telescopic shaft the opposite rod-like member 21 of which has its adjacent end splined and telescopically movable within said tubular member and its opposite end connected through a universal joint 22 to a cam shaft 23 which is journaled in a suitable bearing provided in a support 24 carried by the tool head 6. Said cam shaft has fixed thereon a cam 25 which lies in underlying supporting relation to the outer or free end of a lever 26 which has a downwardly and forwardly inclined head 26' formed on its inner end, the lower portion of said head being pivotally mounted on the inner end of said tool head. The head of said lever is designed as a holder for the cutting tool 27 which may be mounted therein in any appropriate manner. For taking up wear which may occur between the tool head 6 and tool holder, a plate or block 62 is fitted in a recess 65 provided therefor in the tool rest at one side of the mounting 63 for the tool holder, and an adjusting screw 64 is directed through said mounting into engagement with said plate whereby the latter may be adjusted closely against a plain bearing surface 26ª formed on said tool holder.

As is obvious, oscillatory movement of the universal shaft constituted by the splined telescoping shaft members 20 and 21 and the universal joint connections produces corresponding oscillation of the cam 25, which latter effects raising and lowering of the outer end of the lever 26 for advancing and retracting the tool 27 with respect to the work.

The actuations of the cutting tool being designed to produce a backing off action for forming cam surfaces on taps, reamers, milling cutters, and the like, relieving the teeth of the latter, as hereinbefore mentioned, it is evident that the oscillations whereby the tool is advanced and retracted with respect to the work must be regularly and accurately timed. For producing properly timed oscillations a master cam 16 having plurality of cam surfaces or teeth is employed, the same being associated with suitable mechanism interposed between it and said universal shaft for converting its rotary movement into an oscillatory movement of said shaft. Included in said mechanism is a crank arm 28 fixed on the spindle 18, the same having pivotally connected thereto one end of a reciprocating bar 29 which carries on its opposite end an anti-friction roller 30 adapted to travel upon the periphery of said master cam. The arm 28 is normally held in an inwardly drawn position, as by means of a suitably positioned retractile coil spring 31, said spring being herein shown connected at one end to the pivot-pin 32 whereby said bar 29 is connected to said arm 28, and at its opposite end to a suitable part located relatively inward with respect to said arm. A portion of the body of the bar 29 adjacent to the roller-supporting end thereof is projected through and is slidable in an oscillatory supporting member 33 which is mounted in and has oscillatory movement in a bearing 34 formed on the bracket 14. Thus, as is apparent, the spring 31 maintains the bar 29 thrust inward with the roller 30 constantly in engagement with the master cam 16. As said cam rotates, the roller 30 travels over the cam surfaces thereof and effects a reciprocation of said bar 29 which, through the crank arm 28, imparts to the universal shaft an oscillatory movement. It will be noted that the number of oscillations and resultant advance and return movements of the tool with respect to the work during a single revolution of the latter corresponds with the number of teeth or cam surfaces on the periphery of the master cam, assuming, of course, that the work and the master cam are geared to travel at the same speed, as shown in the drawings. Further, the depth of the cut of the tool bears a direct relation to the height of the teeth of the master cam above the lowest points on its periphery, assuming that the cam 25 has been adjusted to permit the tool to engage the work.

From the foregoing it will be obvious, therefore, that, assuming that the cam-spindle 12 is geared to rotate at a uniform speed with the lathe spindle, the master cam employed must be provided with a number of teeth corresponding to the number of longitudinal flute-separated surfaces on the work, and also that the depth of said teeth must bear a direct relation to the movement desired for the cam 25. It is apparent, however, that the gear ratio between the master cam spindle and the lathe spindle may be varied so that the master cam may be employed for two or more different pieces of work, as, for instance, a five-toothed cam may be employed both for pieces of work having five teeth and ten teeth by transposing the gears 9 and idler 10, provision for which is made by mounting said idler on a pin or spindle 35 which is adjustably mounted in a slot 36 provided in the upper end of a sweep-arm 37. Said sweep-arm is pivoted intermediate its ends upon bracket 14 around the master-cam spindle 12 and has an arcuately curved slot 38 provided in its lower end through which extends a screw 39 which is adjustably mounted in a projecting portion 40 of bracket 14. The sweep-arm may be swung on the spindle 12 to any desired position, whereupon, by tightening the adjusting screw 39 to bind upon the sweep-arm, the latter is held firmly in said position. The slot 36 provides for adjusting the position of the pin 35 to accommodate the gear mounted thereon to the gear carried by the spindle 12.

For the purpose of holding inoperative the parts composing the invention herein described, as when it is desired to temporarily employ the lathe for a purpose not requiring the use of said parts, an end of an arm 41 is mounted on the inner end of the oscillatory support 33 and is adapted to be swung downward to a position wherein its opposite or free end engages a notch or recessed seat 42 provided therefor in the crank arm 28. In said seated position said arm 41 braces the crank arm 28 in a position wherein the bar 29 and its roller 30 are withdrawn from the path of movement of the master cam. A nut 43 is adapted to be tightened against the friction washer or disk 66 between nut 43 and arm 41 for holding the latter in adjusted position, as is clearly shown in Figs. 4 and 5.

The upper edge or surface of the cam 25, which projects inward toward the work from the universal shaft, has a gradual curvature of substantially elliptic form, as shown in Figs. 8 and 9. Consequently, the upward swinging of the overlying lever 26 and the resultant inward or advance movement of the tool 27 with respect to the work, induced by oscillation of the universal shaft, is relatively slow or gradual for producing a gradual backing off, or relieving, cut. By adjustment of the elevation of the point of said cam the extent of movement of the tool and, consequently, the depth of the cut produced thereby is regulated. To provide for such adjustment I have devised a simple and efficient mechanism associated with the cam shaft 23 upon which said cam 25 is keyed. Said mechanism comprises a sleeve 44 having one end fitted upon the inner end of said cam shaft 23 and having received within its opposite end the pivot block 45 of the universal joint 22. The outer end of said sleeve 44 has formed therein a threaded socket 46 of materially greater diameter than the cam shaft 23, and fitted within said socket so as to frictionally engage the adjacent end of said sleeve is a worm gear 47 having an integral shaft embracing sleeve 47′ keyed on said shaft. A gland or follower 48 embraces said sleeve 47′ and is threaded within socket 46 to impinge upon said worm gear 47 for maintaining the latter and, consequently, the cam shaft 23 in adjusted position with respect to the universal joint 22. Rotatably mounted in a transversely disposed bearing 49 formed on said sleeve 44 is a stem 50 having thereon a worm 51 operatively associated with the worm gear 47, said stem also having a knurled thumb wheel 52 on its outer end whereby it may be rotated. As is obvious, rotation of said stem 50 will accomplish, through the worm 51 and worm-gear 47, adjustment of the cam shaft 23 and cam 25 with respect to the universal shaft, lowering or elevating said cam according to the direction of rotation of said worm.

Actuations of the cutting tool in angular directions—that is, in directions other than at right angles to the work—may be readily obtained by adjustment of the compound rest and of the tool head 6, as is best illustrated in Fig. 10, wherein the slide 5 and tool head 6 are shown disposed at an angle to each other, the tool head also occupying a position disposed at an angle to the direction of travel of the cross slide 4. As shown in Fig. 3, the tool head is pivotally mounted upon the compound slide, the attaching means consisting of an adjustable pivot bolt 53 operating in a suitable channel 54 in said slide.

Suitable means is provided for maintaining the rear end of the lever 26 in seated relation to cam 25, as, for instance, a flat spring 55 may have one end suitably secured upon the front end of the tool head 6 at a point laterally of the lever 26 and have its opposite end disposed in overlying relation to said lever at a point adjacent to the free end of the latter.

What is claimed is—

1. A relieving attachment for lathes including a driver, an oscillatory cam connected to and driven by the driver, means to selectively adjust the cam relative to the driver and fixedly secure same in its adjusted position, and a tool holder operatively related to the cam and being intermittently advanced and retracted thereby.

2. A relieving attachment for lathes including a driver, an oscillatory cam directly coupled to the driver, means for selectively adjusting the cam relative to the driver and fixedly secure the same in its adjusted position, and a tool holder operatively related to the cam for being intermittently advanced and retracted thereby.

3. A relieving attachment for lathes including a cam mounted for limited oscillatory movement, a tool holder comprising a pivoted lever resting directly on the cam, and means for selectively and fixedly adjusting the relative position of the cam to the lever.

4. In mechanism of the character described, the combination with a compound slide, of a tool head adjustable thereon, a tool-holder pivoted on said head, an oscillatory cam mounted on said head and disposed in operative relation to said tool-holder whereby the latter is raised and lowered with the oscillations of the cam, an oscillatory shaft connected to said cam, a rotatable master cam, means interposed between said master cam and said shaft whereby the rotary movement of the former is converted into oscillatory movement of the latter, and a manually operable micrometer adjustment for the oscillatory cam controlling the extent of movement of the tool-holder.

5. In a mechanism of the character described, the combination with the head stock and pivoted tool holder of a lathe, of a rotatable master cam, means operable by the cam for oscillating the pivoted tool holder, a gear connected with the master cam, a second gear with the head stock, a sweep-arm pivoted between its ends, an idler gear adjustable on one end of the sweep-arm for connecting the first two gears, and means whereby the arm may be swung to move the idler into and out of mesh with one of the first two gears.

6. In mechanism of the character described, the combination with a compound slide, of a tool head adjustable thereon, a tool-holder pivoted on said head, an oscillatory cam mounted on said head and disposed in operative relation to said tool-holder whereby the latter is raised and lowered with the oscillations of the cam, an oscillatory shaft connected to said cam, a rotatable master cam, a crank arm associated with said shaft, a reciprocable bar having one end pivoted to said crank arm and adapted to oscillate the latter with each reciprocation thereof, a roller carried by the opposite end of said bar, means for holding the roller out of contact with the master cam, and resilient means holding said crank arm in a position wherein the roller is maintained permanently in engagement with the periphery of said master cam.

7. In mechanism of the character described, the combination with a compound slide, of a tool head adjustable thereon, a tool-holder pivoted on said head, an oscillatory cam mounted on said head and disposed in operative relation to said tool-holder whereby the latter is raised and lowered with the oscillations of the cam, an oscillatory shaft connected to said cam, a rotatable master cam, a crank arm operatively associated with said shaft, a reciprocable bar having one end pivoted to said crank arm and adapted to oscillate the latter at each reciprocation thereof, a fixed guide for the bar, a roller carried by the opposite end of said bar, resilient means holding said crank arm in a position wherein the roller is maintained permanently in engagement with the periphery of said master cam, and means for adjusting the position of the oscillatory cam to control the extent of movement imparted thereby to the tool-holder.

8. In mechanism of the character described, the combination with a compound slide, of a tool head adjustable thereon, a tool-holder pivoted on said head, an oscillatory cam mounted on said head and disposed in operative relation to said tool-holder whereby the latter is raised and lowered with the oscillations of the cam, an oscillatory shaft connected to said cam, said shaft being composed of telescopic sections, a crank arm operatively associated with said shaft, and a reciprocable bar having one end pivoted to said crank arm and adapted to oscillate the latter at each reciprocation thereof, said bar having its opposite end yieldably disposed in operative relation to the periphery of the master cam whereby the latter is actuated.

9. In mechanism of the character described, the combination with a compound slide, of a tool head adjustable thereon, a tool-holder pivoted on said head, an oscillatory cam mounted on said head and disposed in operative relation to said tool-holder whereby the latter is raised and lowered with the oscillations of the cam, an oscillatory shaft connected to said cam, said shaft being composed of telescopic sections, a crank arm operatively associated with said shaft, and a reciprocable bar having one end pivoted to said crank arm and adapted to oscillate the latter at each reciprocation thereof, said bar having its opposite end disposed in the path of movement of the periphery of said master cam, and means yieldably maintaining a positive engagement between said master cam and said bar.

10. In mechanism of the character described, the combination with a compound slide, of a tool head adjustable thereon, a tool-holder pivoted on said head, an oscillatory cam mounted on said head and disposed in operative relation to said tool-holder whereby the latter is raised and lowered with the oscillations of the cam, an oscillatory shaft connected to said cam, said shaft being composed of telescopic sections, a crank arm operatively associated with said shaft, a reciprocable bar having one end pivoted to said crank arm and adapted to oscillate the latter at each reciprocation thereof, said bar having its opposite end disposed in the path of movement of the periphery of said master cam, means yieldably maintaining a positive engagement between said master cam and said bar, and means for adjusting the position of the oscillatory cam to control the extent of movement imparted thereby to the tool-holder.

11. In mechanism of the character described, the combination with a compound slide, of a tool head adjustable thereon, a tool-holder pivoted on said head, an oscillatory cam shaft journaled in said head, a cam fixed on said shaft and disposed in operative relation to said tool-holder whereby the latter is raised and lowered with the oscillations of the cam, an oscillatory shaft having universal joint connection at one end with said cam shaft, a crank arm operatively associated with said oscillatory shaft, a rotatable master cam driven at a speed bearing a direct relation to that of the work to be acted upon by the tool, and means interposed between said master cam and said crank arm whereby the former imparts regularly timed oscillations to the latter.

12. In mechanism of the character described, the combination with a compound slide, of a tool head adjustable thereon, a tool-holder pivoted on said head, an oscillatory cam shaft journaled in said head, a cam fixed on said shaft and disposed in operative relation to said tool-holder whereby the latter is raised and lowered with the oscillations of the cam, an oscillatory shaft having universal joint connection at one end with said cam shaft, a crank arm operatively associated with said oscillatory shaft, a rotatable master cam driven at a speed bearing a direct relation to that of the work to be acted upon by the tool, and a reciprocable bar interposed between said master cam and said crank arm, said master cam being adapted to actuate said bar to reciprocate whereby oscillations are imparted to said oscillatory shaft.

13. In mechanism of the character described, the combination with a compound slide, of a tool head adjustable thereon, a tool-holder pivoted on said head, an oscillatory cam shaft journaled in said head, a cam fixed on said shaft and disposed in operative relation to said tool-holder whereby the latter is raised and lowered with the oscillations of the cam, an oscillatory shaft having universal joint connection at one end with said cam shaft, a spindle having universal joint connection with the opposite end of said oscillatory shaft, a crank arm carried by said spindle, a rotatable master cam driven at a speed bearing a direct relation to that of the work to be acted upon by the tool, a reciprocable bar pivotally connected at one end to said crank arm, a roller carried by the opposite end of said bar, and resilient means maintaining said roller permanently in engagement with the periphery of said master cam.

14. In mechanism of the character described, the combination with a compound slide, of a tool head adjustable thereon, a tool-holder pivoted on said head, an oscillatory cam shaft journaled in said head, a cam fixed on said shaft and disposed in operative relation to said tool-holder whereby the latter is raised and lowered with the oscillations of the cam, an oscillatory shaft having universal joint connection at one end with said cam shaft, a spindle having universal joint connection with the opposite end of said oscillatory shaft, a crank arm carried by said spindle, a rotatable master cam driven at a speed bearing a direct relation to that of the work to be acted upon by the tool, a reciprocable bar pivotally connected at one end to said crank arm, a roller carried by the opposite end of said bar, resilient means maintaining said roller permanently in engagement with the periphery of said master cam, and means for adjusting the position of the oscillatory cam shaft to control the extent of movement imparted therethrough to the tool-holder.

15. In mechanism of the character described, the combination with a compound slide, of a tool head adjustable thereon, a tool-holder pivoted on said head, an oscillatory cam shaft journaled in said head, a cam fixed on said shaft and disposed in operative relation to said tool-holder whereby the latter is raised and lowered with the oscillations of the cam, an oscillatory shaft having universal joint connection at one end with said cam shaft, a spindle having universal joint connection with the opposite end of said oscillatory shaft, a crank arm carried by said spindle, a rotatable master cam driven at a speed bearing a direct relation to that of the work to be acted upon by the tool, a reciprocable bar pivotally connected at one end to said crank arm, a roller carried by the opposite end of said bar, resilient means maintaining said roller permanently in engagement with the periphery of said master cam, and gearing for driving said master cam.

16. In mechanism of the character described, the combination with a compound slide, of a tool head adjustable thereon, a tool-holder pivoted on said head, an oscillatory cam shaft journaled in said head, a cam fixed on said shaft and disposed in operative relation to said tool-holder whereby the latter is raised and lowered with the oscillations of the cam, an oscillatory shaft having universal joint connection at one end with said cam shaft, a supporting bracket, a spindle journaled in said bracket and having universal joint connection with the other end of said oscillatory shaft, a second spindle journaled in said bracket, a master cam fixed on the last-named spindle, gearing whereby said last-named spindle is rotated at a speed bearing a direct relation to the lathe-shaft, and means interposed between said master cam and the first mentioned spindle whereby rotation of the former is converted into oscillatory movement in the latter.

17. In mechanism of the character described, the combination with a tool holder, of means associated with said holder whereby the latter may be moved for advancing and retracting the tool, oscillatory means for actuating said moving means at definite intervals, and means included in said moving means for adjusting said oscillatory means for regulating the extension of actuation of said moving means.

In testimony whereof, I affix my signature in presence of two subscribing witnesses.

OTTO W. STEINDORFF.

Witnesses:
H. E. DUNLAP,
W. F. KEEFER.

Copies of this patent may be obtained for five cents each, by addressing the "Commissioner of Patents, Washington, D. C."